United States Patent [19]

Ueda et al.

[11] Patent Number: 5,648,057

[45] Date of Patent: Jul. 15, 1997

[54] PROCESS FOR PRODUCING $LiM^{3+}O_2$ OR $LiMn_2O_4$ AND $LiNi^{3+}O_2$ FOR USE IN POSITIVE ELECTRODE OF SECONDARY BATTERY

[75] Inventors: Masami Ueda, Kurobe; Tatsuo Murakami, Kamiichi-machi, both of Japan

[73] Assignee: Fuji Chemical Industry Co., Ltd., Toyama, Japan

[21] Appl. No.: 347,291

[22] PCT Filed: Mar. 31, 1994

[86] PCT No.: PCT/JP94/00530

§ 371 Date: Apr. 12, 1995

§ 102(e) Date: Apr. 12, 1995

[87] PCT Pub. No.: WO94/22767

PCT Pub. Date: Oct. 13, 1994

[30] Foreign Application Priority Data

Apr. 1, 1993 [JP] Japan .................. 5-098472
Mar. 28, 1994 [JP] Japan .................. 6-080895

[51] Int. Cl.[6] .................. C01G 45/12; C01G 51/04; C01G 53/04
[52] U.S. Cl. .................. 423/594; 423/599; 429/218; 429/223; 429/224
[58] Field of Search .................. 423/594, 599

[56] References Cited

U.S. PATENT DOCUMENTS 4,980,080 12/1990 Lecerf et al. .
5,110,696 5/1992 Shokoohi et al. .................. 423/594
5,211,933 5/1993 Barboux et al. .................. 423/594
5,393,622 2/1995 Nitta et al. .................. 423/594
5,490,320 2/1996 Hasegawa et al. .................. 423/594

FOREIGN PATENT DOCUMENTS 63-59507 3/1988 Japan .
63-210028 8/1988 Japan .
3-47464 3/1991 Japan .

*Primary Examiner*—Wayne Langel
*Attorney, Agent, or Firm*—Larson and Taylor

[57] ABSTRACT

A process for producing a compound of the formula $LiM^{3+}O_2$ (wherein $M^{3+}$ $Ni^{3+}$ is or/and $Co^{3+}$) or $LiMn_2O_4$ is provided which comprises the steps of reacting a basic metal salt represented by the formula $M^{2+}(OH)_{2-nx}(A^{n-})_x \cdot mH_2O$ (wherein $M^{2+}$ is at least one member selected from among $Ni^{2+}$, $Co^{2+}$ and $Mn^{2+}$, $A^{n-}$ is an n-valent anion (provided that n is 1 to 3), such as $NO_3^-$, $Cl^-$, $Br^-$, $CH_3COO^-$ and $CO_3^{2-}$ and x and m are positive numbers respectively satisfying $0.03 \leq x \leq 0.3$ and $0 \leq m \leq 2$) with an alkaline water-soluble lithium compound in a molar ratio of $Li/M^{2+}$ of 0.3 to 1.3 in an aqueous medium to obtain a slurry, drying the obtained slurry, and firing the resultant residue at about 500° C. or higher in an oxidative atmosphere. This process ensures production of the $LiM^{3+}O_2$ and $LiMn_2O_4$, which are highly purified and have high crystallization degrees, in large quantities on a commercial scale. The thus produced $LiNi^{3+}O_2$ exhibits excellent charge-discharge characteristics as an active material of a positive electrode of a secondary battery.

5 Claims, 4 Drawing Sheets

PROCESS FOR PRODUCING LiM³⁺O₂ OR LiMn₂O₄ AND LiNi³⁺O₂ FOR USE IN POSITIVE ELECTRODE OF SECONDARY BATTERY

TECHNICAL FIELD

The present invention relates to a novel process for producing a compound of the formula $LiM^{3+}O_2$ (wherein $M^{3+}$ is $Ni^{3+}$ or/and $Co^{3+}$) or $LiMn_2O_4$ useful as a material of a positive electrode of a rechargeable secondary battery, and further relates to $LiNi_{3+}O_2$ for use in a positive electrode of a secondary battery which is obtained by the above process.

BACKGROUND ART $LiCoO_2$ (lithium cobaltate) is now being widely used as an active material of a positive electrode of a secondary battery. $LiCoO_2$ is being produced by a complicated and inefficient process comprising performing dry or wet mixing of powdery $Li_2CO_3$ and powdery $COCO_3$, preliminarily firing the mixture, carrying out pulverization and mixing of the preliminarily fired mixture and finally firing the resultant mixture as described in Japanese Patent Application Laid-Open Specification No. 294373/1989. In this process, not only is producing a $LiCoO_2$ having a uniform composition difficult but also impurities are liable to occur as by-products, so that there has been a limitation in obtaining an active material having high charge and discharge characteristics. Moreover, cobalt output is small from the viewpoint of natural resources, and it is believed that meeting an increased demand would be difficult in the future.

In such circumstances, in place of the above $COCO_3$, it has been attempted in recent years to treat $NiCO_3$ or $MnCO_3$ which is less expensive and more abundant in reserves, by the above method in order to use the same as an active material of a secondary battery. However, the $LiNiO_2$ and $LiMn_2O_4$ thus produced more clearly have the problems described above with respect to $LiCoO_2$, with the result that the resultant products are so poor in purity that there is none which can be put into practical use.

On the other hand, Dyer et al developed another process for synthesizing $LiNiO_2$, which was disclosed in Journal of American Chemical Society 76, 1499 (1954). This synthetic process is illustrated in FIG. 4, in which use is made of a double-pipe apparatus comprising an outer nickel pipe 1 and, inserted therein, an inner nickel pipe 2. The inner pie 2 has its inserted tip portion opened to thereby have a blowoff aperture 3. A predetermined amount, e.g., 50 g, of powdery LiOH 4 is filled in the outer pipe 1. While the overall double-pipe apparatus is heated at about 800° C. to thereby melt the LiOH, oxygen is fed into the inner pipe 2 and blown out from the blowoff aperture 3 for 24 hours. Thus, $LiNiO_2$ mass 5 covered with a LiOH film is formed on the inner surface of the outer pipe 1 at its portion near the blowoff aperture 3. This $LiNiO_2$ mass 5 is washed with alcohol, and contaminant nickel oxide is removed by magnet attraction, thereby producing highly purified $LiNiO_2$.

Although the process of Dyer et al is applicable in an experimental stage, it is not suitable for a mass-production and cannot be put into commercial use. Not only are a large amount of impurities formed as by-products, but also an apparatus having a complicated structure and an intricate processing are required, so that this process has not been put into practical use. Moreover, X-ray diffractometry shows that the $LiNiO_2$ obtained by this process has a ratio of absorption peak intensity relating to crystal face (003) to absorption peak intensity relating to crystal face (104) of 100/95 = about 1.05, the above crystal face being defined by Miller indices (hkl). In general, when $LiNiO_2$ is used as an active material of a positive electrode of a secondary battery, it has been found that the greater the above ratio of peak intensity of crystal face (003) to that of crystal face (104), the more excellent the charge-discharge characteristics thereof. At the above peak ratio, improvement of the charge-discharge characteristics can be expected only to a certain level.

The present invention has been made in view of these circumstances. An object of the present invention is to provide a process for producing a compound of the formula $LiM^{3+}O_2$ (wherein $M^{3+}$ is $Ni^{3+}$ or/and $Co^{3+}$) or $LiMn_2O_4$ not only having a high purity, a high crystallization degree and a wide range of crystalline particle sizes but also exhibiting excellent charge-discharge characteristics when used as an active material of a positive electrode of a secondary battery, which process can be easily performed by simple operations, such as firing made at low temperatures for a short time, and which process permits industrial mass-production. Another object of the present invention is to provide $LiNi^{3+}O_2$ for use in a positive electrode of a secondary battery obtained by the above process.

DISCLOSURE OF THE INVENTION

The process for producing a compound of the formula $LiM^{3+}O_2$ (wherein $M^{3+}$ is $Ni^{3+}$ or/and $Co^{3+}$) or $LiMn_2O_4$ according to the present invention is characterized by the steps of reacting an alkaline water-soluble lithium compound and a basic metal salt each containing an anion, which is evaporated off during a later firing, in an aqueous medium to obtain a slurry, drying the obtained slurry, and firing the resultant residue.

The lithium compound and basic metal salt to be used in the present invention each contain an anion which is evaporated off during the firing described later. The lithium compound may be at least one member selected from among LiOH, $Li_2CO_3$ and hydrates thereof. The $M^{2+}$ as a component of the basic metal salt $(M^{2+}(OH)_{2-nx})_x \cdot mH_2O$ may be at least one member selected from among $Ni^{2+}$, $Co^{2+}$ and $Mm^{2+}$, and the anion or $A^{n-}$ as another component may be selected from among n-valent anion compounds (provided that n is 1 to 3), such as $NO_3^-$, $Cl^-$, $Br^-$, $CH_3COO^-$ and $CO_3^{2-}$. Of these, LiOH is preferred as the lithium compound and $Ni^{2+}(OH)_{2-x}(NO_3)_2 \cdot mH_2O$ (wherein x is $0.03 \leq x \leq 0.3$, preferably $0.05 \leq x \leq 0.2$) is preferred as the basic metal salt, from the viewpoint of reactivity, yield, effective utilization of natural resources and oxidation accelerating effect. This combination is particularly advantageous from the viewpoint of battery characteristics as demonstrated by the Examples described later. These lithium compound and basic metal salt are mixed together in an aqueous medium to achieve the desired reaction. Although the concentration of the reaction mixture is not particularly limited, it may be appropriately selected within the range of 5 to 25% by weight. The reaction temperature may also appropriately be selected within the range of room temperature to 100° C., which is not critical in the present invention.

The characteristic feature of the present invention resides in the use of a basic salt of $M^{2+}$ having a specific composition as a compound of $M^{2+}$. This basic salt of $M^{2+}$ having a specific composition has a lamellar structure, and both the chemical composition and crystalline structure thereof are similar to those of $M^{2+}(OH)_2$. Moreover, it is microcrystalline and has a high specific surface area to exhibit a high reactivity, so that it is readily converted to $M^{2+}(OH)_2$ by the reaction with an alkaline lithium compound, such as LiOH, thereby forming an extremely desirable precursor of LiM$^{2+}$O$_2$ or LiMn$_2$O$_4$.

Highly purified LiM$^{3+}$O$_2$ and LiMn$_2$O$_4$ having a high crystallization degree according to the present invention can be obtained only when such a basic metal salt having a specific composition is used. The M$^{2+}$(OH)$_2$ is inferior in the reactivity with the alkaline lithium compound to the basic metal salt. On the other hand, when the amount of the anion is increased, not only is the structure of the basic metal salt increasingly deviated from the lameller structure, but also the conversion to M$^{2+}$(OH)$_2$ after the reaction with the alkaline lithium compound becomes incomplete and, moreover, the anion inhibitively acts on the formation of the LiM$^{3+}$O$_2$ or LiMn$_2$O$_4$ during the firing, so that a desired compound having a high purity and a high crystallization degree cannot be obtained.

The basic metal salt to be used in the present invention can be prepared by adding an alkali to an aqueous solution of M$^{2+}$ in an amount of about 0.7 to 0.95 equivalent, preferably 0.8 to 0.95 equivalent per M$^{2+}$ and reacting at a temperature of about 80° C. or lower. The alkalis suitable for use in the reaction include alkali metal hydroxides such as sodium hydroxide, alkaline earth metal hydroxides such as calcium hydroxide, amines and the like. In this connection, it is preferred that, after the preparation, this basic metal salt be matured at 40° to 70° C. for 0.1 to 10 hours. Subsequently, any by-products are removed by washing with water, and the resultant basic metal salt is reacted with the lithium compound.

The drying of the slurry obtained by the above-mentioned reaction may be effected by any of the conventional methods, such as, in-oven heat drying, spray drying and vacuum drying. Of these, spray drying is preferred from the viewpoint of uniformity of the formed composition, thermal efficiency and productivity.

The firing is effected at a temperature ranging from about 500° to 1000° C. for about 0.1 to 20 hours. Preferably, the firing is effected at a temperature ranging from about 700° to 800° C. Moreover, it is preferred that the firing be effected in an oxidative gas atmosphere containing air, oxygen or ozone.

The thus obtained LiM$^{3+}$O$_2$ or LiMn$_2$O$_4$ ensures improvement of characteristics as an active material of a positive electrode. For example, with respect to LiNiO$_2$, no impurities, such as NiO, are formed and crystals having less lattice defect and strain and having high crystallization degree are obtained, so that the ratio of peak intensity of crystal face (003) to that of crystal face (104) is high in an X-ray diffraction pattern and that the proportion of the trivalent Ni is at least 97%, in preferred cases, nearly 100%.

As demonstrated by the Examples described later, the above highly purified and highly uniform LiM$^{3+}$O$_2$ and LiMn$_2$O$_4$ crystals having a high crystallization degree exhibit a high ratio of diffraction peak intensity of crystal face (003) with respect to the former and (111) with respect to the latter to that of crystal face (104) with respect to the former and (400) with respect to the latter. Further, the LiM$^{3+}$O$_2$ crystals contain M whose trivalent proportion is high. Thus, it is apparent that excellent battery characteristics are realized.

BEST MODES FOR CARRYING OUT THE INVENTION

EXAMPLE 1

Figure 1:
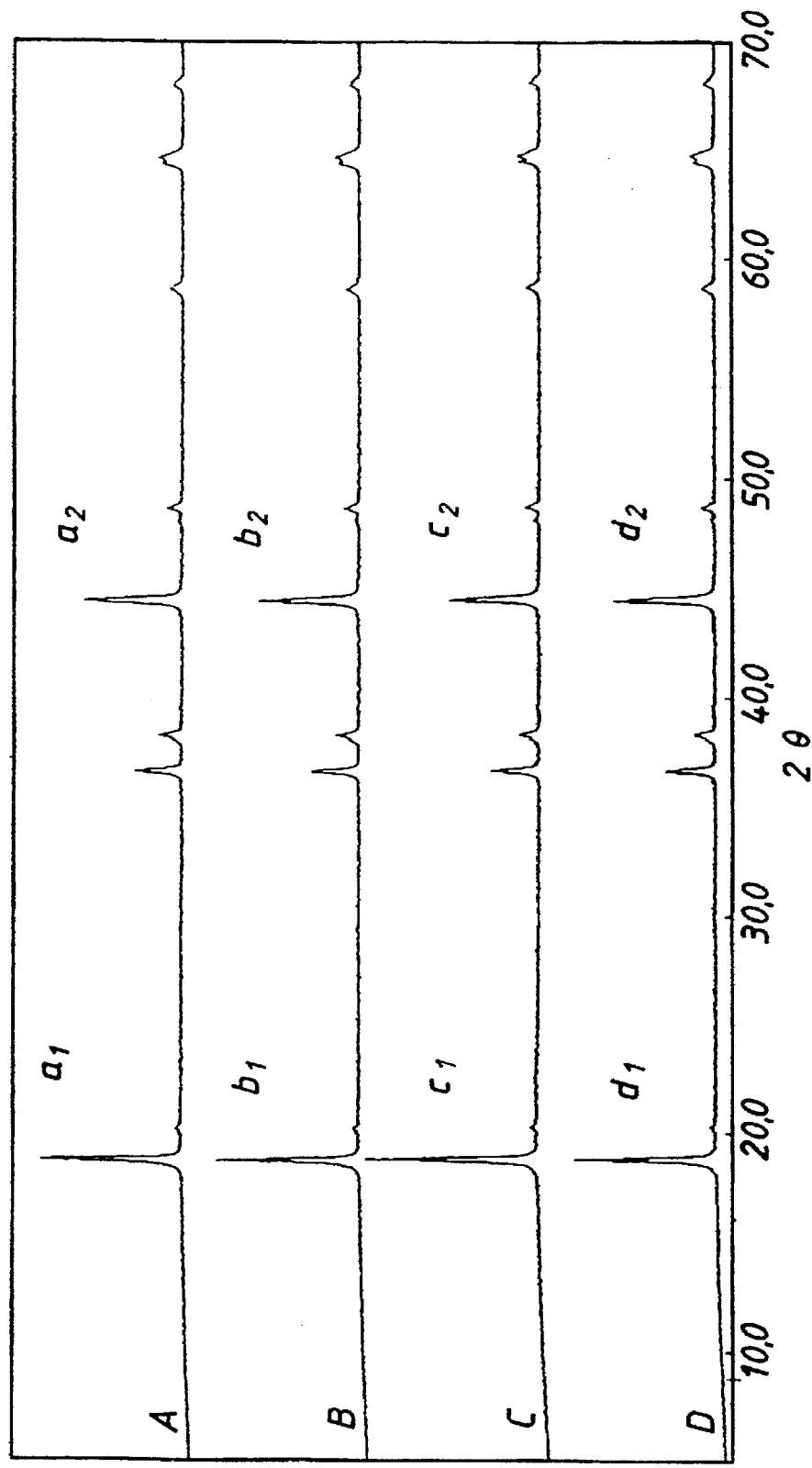
FIG. 1 shows characteristic X-ray diffraction patterns obtained in Examples 1 to 4 of the present invention.

467 ml of a 1.5 mol/liter aqueous calcium hydroxide suspension was added under agitation to 500 ml of a 2 mol/liter aqueous nickel nitrate solution, thus the molar ratio of Ca/Ni being 0.7. The resultant reaction mixture was filtered to obtain a filter cake, which was washed with water and suspended in water, thereby obtaining a 1 mol/liter Ni(OH)$_{2-x}$(NO$_3$)$_x$ (wherein x is 0.30) slurry. A 3.5 mol/liter aqueous lithium hydroxide solution was dropwise added to the obtained slurry in an amount such that the atomic ratio of Li/Ni was 1.05 with respect to the Ni contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery LiNiO$_2$.

EXAMPLE 2

533 ml of a 1.5 mol/liter aqueous calcium hydroxide suspension was added under agitation to 500 ml of a 2 mol/liter aqueous nickel nitrate solution, thus the molar ratio of Ca/Ni being 0.8. The resultant reaction mixture was filtered to obtain a filter cake, which was washed with water and suspended in water, thereby obtaining a 1 mol/liter Ni(OH)$_{2-x}$(NO$_3$)$_x$ (wherein x is 0.20) slurry. A 3.5 mol/liter aqueous lithium hydroxide solution was dropwise added to the obtained slurry in an amount such that the atomic ratio of Li/Ni was 1.05 with respect to the Ni contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery LiNiO$_2$.

EXAMPLE 3

633 ml of a 1.5 mol/liter aqueous calcium hydroxide suspension was added under agitation to 500 ml of a 2 mol/liter aqueous nickel nitrate solution, thus the molar ratio of Ca/Ni being 0.95. The resultant reaction mixture was filtered to obtain a filter cake, which was washed with water, suspended in water and matured at 45° C. for 15 minutes. The matured suspension was filtered, and then resuspended in water, thereby obtaining a 1 mol/liter Ni(OH)$_{2-x}$(NO$_3$)$_x$ (wherein x is 0.05) slurry. A 3.5 mol/liter aqueous lithium hydroxide solution was dropwise added to the obtained slurry in an amount such that the atomic ratio of Li/Ni was 1.05 with respect to the Ni contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery LiNiO$_2$.

EXAMPLE 4

1900 ml of a 1.0 mol/liter aqueous sodium hydroxide solution was added under agitation to 500 ml of a 2 mol/liter aqueous nickel nitrate solution, thus the molar ratio of Na/Ni being 1.9. The resultant reaction mixture was filtered to obtain a filter cake, which was washed with water, suspended in water and matured at 60° C. for 15 minutes. The matured suspension was filtered, and then resuspended in water, thereby obtaining a 1 mol/liter $Ni(OH)_{2-x}(NO_3)_x$ (wherein x is 0.03) slurry. A 3.5 mol/liter aqueous lithium hydroxide solution was dropwise added to the obtained slurry in an amount such that the atomic ratio of Li/Ni was 1.05 with respect to the Ni contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiNiO_2$.

EXAMPLE 5

533 ml of a 1.5 mol/liter aqueous calcium hydroxide suspension was added under agitation to 500 ml of a 2 mol/liter aqueous nickel chloride solution, thus the molar ratio of Ca/Ni being 0.8. The resultant reaction mixture was filtered to obtain a filter cake, which was washed with water and suspended in water, thereby obtaining a 1 mol/liter $Ni(OH)_{2-x}(Cl)_x$ (wherein x is 0.20) slurry. A 3.5 mol/liter aqueous lithium hydroxide solution was dropwise added to the obtained slurry in an amount such that the atomic ratio of Li/Ni was 1.05 with respect to the Ni contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiNiO^2$.

EXAMPLE 6

1900 ml of a 1.0 mol/liter aqueous sodium hydroxide solution was added under agitation to 500 ml of a 2 mol/liter aqueous nickel chloride solution, thus the molar ratio of Na/Ni being 1.9. The resultant reaction mixture was filtered to obtain a filter cake, which was washed with water and suspended in water, thereby obtaining a 1 mol/liter $Ni(OH)_{2-x}(Cl)_x$ (wherein x is 0.05) slurry. A 3.5 mol/liter aqueous lithium hydroxide solution was dropwise added to the obtained slurry in an amount such that the atomic ratio of Li/Ni was 1.05 with respect to the Ni contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiCoO_2$.

EXAMPLE 7

1900 ml of a 1.0 mol/liter aqueous sodium hydroxide solution was added under agitation to 500 ml of a 2 mol/liter aqueous cobalt nitrate solution, thus the molar ratio of Na/Co being 1.9. The resultant reaction mixture was filtered to obtain a filter cake, which was washed with water and suspended in water, thereby obtaining a 1 mol/liter $Co(OH)_{2-x}(NO_3)_x$ (wherein x is 0.05) slurry. A 3.5 mol/liter aqueous lithium hydroxide solution was dropwise added to the obtained slurry in an amount such that the atomic ratio of Li/Co was 1.05 with respect to the Co contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiCoO_2$.

EXAMPLE 8

1900 ml of a 1.0 mol/liter aqueous sodium hydroxide solution was added under agitation to 500 ml of a 2 mol/liter aqueous manganese nitrate solution, thus the molar ratio of Na/Mn being 1.9. The resultant reaction mixture was filtered to obtain a filter cake, which was washed with water and suspended in water, thereby obtaining a 1 mol/liter $Mn(OH)_{2-x}(NO_3)_x$ (wherein x is 0.05) slurry. A 3.5 mol/liter aqueous lithium hydroxide solution was dropwise added to the obtained slurry in an amount such that the atomic ratio of Li/Mn was 0.52 with respect to the Mn contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiMnO_2$.

COMPARATIVE EXAMPLE 1

300 ml of a 3.5 mol/liter aqueous lithium hydroxide solution was dropwise added under agitation to 500 ml of a 2 mol/liter aqueous nickel nitrate solution, thus the atomic ratio of Li/Ni being 1.05. Thereafter, the resultant reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiNiO_2$.

COMPARATIVE EXAMPLE 2

2000 ml of a 1.0 mol/liter aqueous sodium hydroxide suspension was added under agitation to 500 ml of a 2 mol/liter aqueous nickel nitrate solution, thus the molar ratio of Na/Ni being 2.0, to effect a reaction. The resultant reaction mixture was filtered to obtain a filter cake, which was washed with water and suspended in water to obtain a 1 mol/liter $Ni(OH)_2$ slurry. A 3.5 mol/liter aqueous lithium hydroxide solution was dropwise added to the obtained slurry in an amount such that the atomic ratio of Li/Ni was 1.05 with respect to the Ni contained in the above suspension to effect a reaction. Thereafter, the reaction mixture was spray dried to obtain a xerogel. The xerogel was put in an alumina boat, and then in a tube furnace, where the mixture was fired at 750° C. for 10 hours in an atmosphere of oxygen. The resultant firing product was pulverized in a mortar, thereby obtaining powdery $LiNiO_2$.

COMPARATIVE EXAMPLE 3

1900 ml of an aqueous sodium hydroxide solution was added under agitation to 500 ml of a 2 mol/liter aqueous nickel nitrate solution, thus the molar ratio of Na/Ni being 1.9. The resultant reaction mixture was filtered to obtain a filter cake, which was washed with water and dried to obtain a $Ni(OH)_{2-x}(NO_3)_x \cdot 1.2H_2O$ (wherein x is 0.05) dry powder. Lithium hydroxide powder was added to this dry powder in an amount such that the atomic ratio of Li/Ni was 1.05 with respect to the Ni contained in the above powder. The mixture was pulverized and mixed in a mortar. Thereafter, the resultant mixture was put in an alumina boat, and then in a tube furnace, where the mixture was fired at 750° C. for 10 hours in an atmosphere of oxygen. The resultant firing product was pulverized in a mortar, thereby obtaining powdery $LiNiO_2$.

COMPARATIVE EXAMPLE 4

2000 ml of a 1.0 mol/liter aqueous sodium hydroxide solution was added under agitation to 500 ml of a 2 mol/liter aqueous cobalt nitrate solution, thus the molar ratio of Na/Co being 2.0. The resultant reaction mixture was filtered to obtain a filter cake, which was washed with water and suspended in water, thereby obtaining a 1 mol/liter $Co(OH)_2$ slurry. A 3.5 mol/liter aqueous lithium hydroxide solution was dropwise added to the obtained slurry in an amount such that the atomic ratio of Li/Co was 1.05 with respect to the Co contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiCoO_2$.

COMPARATIVE EXAMPLE 5

2000 ml of a 1.0 mol/liter aqueous sodium hydroxide solution was added under agitation to 500 ml of a 2 mol/liter aqueous manganese nitrate solution, thus the molar ratio of Na/Mn being 2.0. The resultant reaction mixture was filtered to obtain a filter cake, which was washed with water and suspended in water, thereby obtaining a 1 mol/liter $Mn(OH)_2$ slurry. A 3.5 mol/liter aqueous lithium hydroxide solution was dropwise added to the obtained slurry in an amount such that the atomic ratio of Li/Mn was 0.52 with respect to the Mn contained in the above suspension to effect a reaction. Thereafter, the reaction mixture was spray dried to obtain a xerogel. The xerogel was put in an alumina boat, and then in a tube furnace, where the xerogel was fired at 750° C. for 10 hours in an atmosphere of oxygen. The resultant firing product was pulverized in a mortar, thereby obtaining powdery $LiMnO_2$.

Each of the powdery $LiM^{3+}O_2$ and $LiMn_2O_4$ compounds obtained in the above Examples 1 to 8 and Comparative Examples 1 to 5 was subjected to crystal identification by X-ray diffractometry, composition analysis by atomic absorption analysis and battery test in which the individual compound was used as an active material of a positive electrode of a lithic secondary battery.

The battery test was carried out as follows. First, each of the powdery $LiM^{3+}O_2$ and $LiMn_2O_4$ compounds obtained in Examples 1 to 8 and Comparative Examples 1 to 5 was mixed with a conductive binder (polytetrafluoroethylene-acetylene black) in a weight ratio of 2:1. Thereafter, the mixture was formed under pressure into pellets each having a thickness of 0.5 mm and a diameter of 18 mm. The resultant pellets were press-bonded at a pressure of 1 t/cm² to an expanded stainless steel mesh by means of a pressing machine, thereby obtaining a positive electrode molding.

Separately, a disk of 18 mm in diameter was blanked from a lithium metal sheet, and used as an active material of negative electrode. The positive electrode molding was put in a coin type cell composed of stainless steel, and an electrolyte in which 1 mol/liter $LiPF_6$ was dissolved in a 1:4 mixture of propylene carbonate and ethylene carbonate was poured into the cell in an appropriate amount. A separator, the above active material of negative electrode and a negative electrode case were piled in this order on the electrolyte, thereby obtaining a lithic secondary battery for test. All of the above procedure was conducted in an atmosphere of argon. The performance of the active material of the positive electrode was evaluated by repeating charging and discharging the thus obtained lithic secondary battery and measuring the initial discharge capacity and the discharge capacity decrease attributed to the repetition of charging and discharging. The above charging and discharging were performed under a voltage control between 3V and 4.3V at a constant current of 1 mA.

Figure 2:
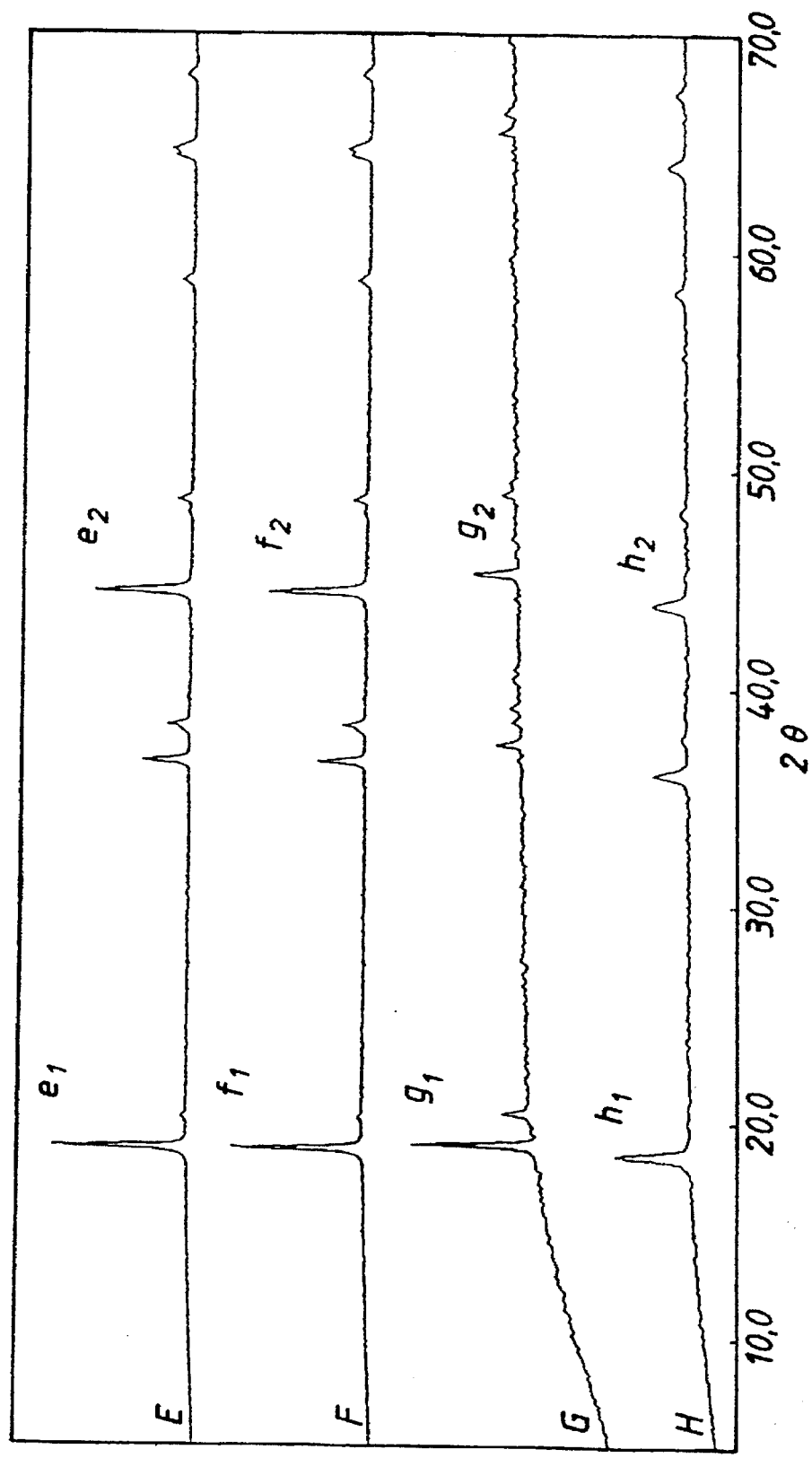
FIG. 2 shows characteristic X-ray diffraction patterns obtained in Examples 5 to 8 of the present invention.
Figure 3:
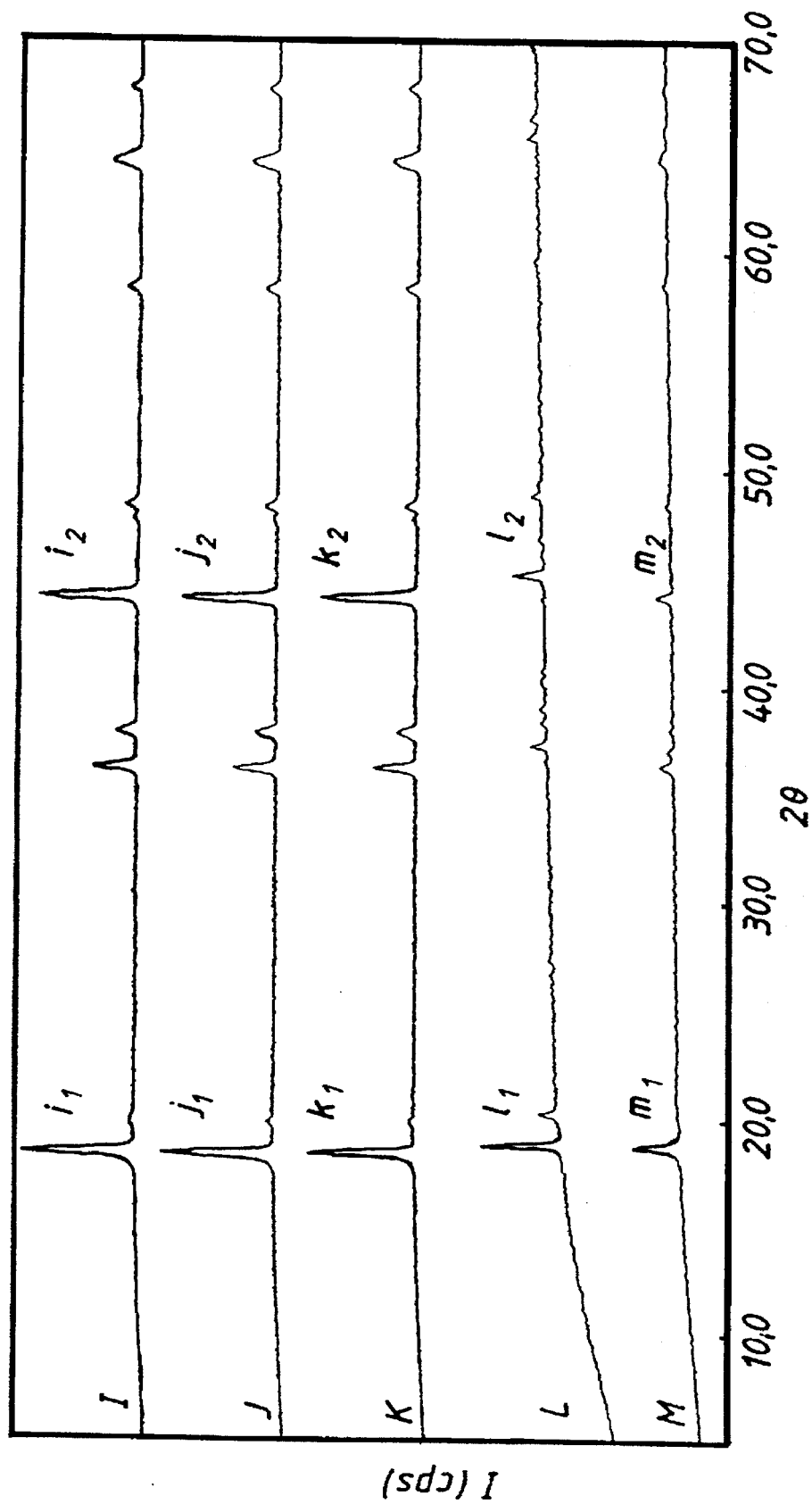
FIG. 3 shows characteristic X-ray diffraction patterns obtained in Comparative Examples 1 to 5.
Figure 4:
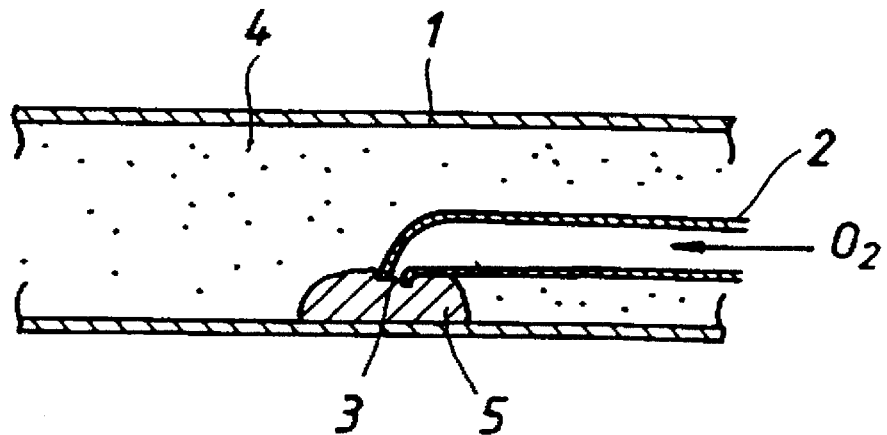
FIG. 4 is a diagram of the conventional productional process.

FIGS. 1 to 3 are X-ray diffraction patterns. In FIG. 1, the characteristic curves A, B, C and D show the results of Examples 1, 2, 3, and 4, respectively. In FIG. 2, the characteristic curves E, F, G and H show the results of Examples 5, 6, 7 and 8, respectively. In FIG. 3, the characteristic curves I, J, K, L and M show the results of Comparative Examples 1, 2, 3, 4 and 5, respectively. In the Figures, the axis of abscissas indicates a multiple of θ, i.e., 2θ, wherein θ satisfies Bragg's formula: $n\lambda=2d\ sin\theta$ (wherein n is a positive integer, λ is the wavelength of X-ray, d is the distance separating crystal faces and θ is the angle of incidence of X-ray) is plotted, while the axis of ordinates indicates the intensity (I) of X-ray in terms of the number of counts. In the characteristic curves, the peaks $a_1$, $b_1$, $c_1$, $d_1$, $e_1$, $f_1$, $g_1$, $i_1$, $j_1$, $k_1$ and $l_1$ appearing when the 2θ is about 19° are diffraction peaks of crystal face (003). The peaks $h_1$ and $m_1$ appearing at the same 2θ are diffraction peaks of crystal face (111). The peaks $a_2$, $b_2$, $c_2$, $d_2$, $e_2$, $f_2$, $g_2$, $i_2$, $j_2$, $k_2$ and $l_2$ appearing when the 2θ is about 45° are diffraction peaks of crystal face (104). The peaks $h_2$ and $m_2$ appearing at the same 2θ are diffraction peaks of crystal face (400). The peak intensity values were measured, and the ratio of peak intensity of crystal face (003) (crystal face (111) with respect to $LiMn_2O_4$) to peak intensity of crystal face (104) (crystal face (400) with respect to $LiMn_2O_4$) was calculated therefrom. As a result, it was found that the above ratios of Examples 1, 2, 3, 4, 5, 6, 7 and 8 were 1.43, 1.50, 1.68, 1.45, 1.37, 1.38, 3.23, 2.40, respectively. Therefore, it was demonstrated that the compounds of the present invention would exhibit excellent charge-discharge characteristics when used as an active material of a positive electrode of a secondary battery.

Table 1 shows the identification results and peak intensity ratios obtained by the X-ray diffractometry and the results of composition analysis of the Examples and Comparative Examples obtained by the atomic absorption analysis. On the other hand, Table 2 shows the battery test results.

TABLE 1

| | Results of X-ray Diffractometry | | Results of Composition Analysis | | | |
|---|---|---|---|---|---|---|
| | Identification | Peak Ratio | Li (Wt %) | M (Wt %) | $Ni^{+3}$% or $Co^{+3}$% | Li/M Molar Ratio |
| Example 1 | $LiNiO_2$ only | 1.43 | 6.31 | 50.65 | 97.4 | 1.06 |
| Example 2 | $LiNiO_2$ only | 1.50 | 6.13 | 49.96 | 99.8 | 1.04 |
| Example 3 | $LiNiO_2$ only | 1.68 | 6.69 | 51.71 | 100.0 | 1.02 |
| Example 4 | $LiNiO_2$ only | 1.45 | 6.38 | 53.22 | 97.9 | 1.02 |
| Example 5 | $LiNiO_2$ only | 1.37 | 7.13 | 58.92 | 97.1 | 1.03 |
| Example 6 | $LiNiO_2$ only | 1.38 | 7.25 | 60.92 | 97.2 | 1.01 |
| Example 7 | $LiCoO_2$ only | 3.23 | 6.53 | 53.47 | 99.6 | 1.04 |
| Example 8 | $LiMn_2O_4$ only | 2.40 | 3.41 | 57.57 | — | 0.51 |
| Comparative Example 1 | $LiNiO_2$ only | 1.13 | 6.32 | 52.30 | 90.3 | 1.02 |
| Comparative Example 2 | $LiNiO_2$ only | 1.18 | 6.10 | 50.30 | 92.1 | 1.03 |
| Comparative Example 3 | $LiNiO_2$ only | 1.12 | 6.26 | 50.90 | 90.1 | 1.04 |
| Comparative Example 4 | $LiCoO_2$ only | 2.60 | 6.08 | 51.12 | 91.8 | 1.01 |
| Comparative Example 5 | $LiMn_2O_4$ only | 2.10 | 3.38 | 55.12 | — | 0.52 |

TABLE 2

| | Initial Discharge Capacity (mAh/g) | Discharge Capacity at 10th Discharge (mAh/g) | Discharge Capacity at 20th Discharge (mAh/g) |
|---|---|---|---|
| Example 1 | 152.5 | 140.2 | 134.4 |
| Example 2 | 174.6 | 170.5 | 165.6 |
| Example 3 | 186.5 | 179.2 | 170.2 |
| Example 4 | 157.1 | 148.0 | 137.8 |
| Example 5 | 140.2 | 138.6 | 125.5 |
| Example 6 | 143.2 | 138.7 | 127.6 |
| Example 7 | 151.3 | 145.2 | 138.0 |
| Example 8 | 145.6 | 140.3 | 135.6 |
| Comparative Example 1 | 110.5 | 55.0 | 23.2 |
| Comparative Example 2 | 135.8 | 98.5 | 60.3 |
| Comparative Example 3 | 130.4 | 96.2 | 54.3 |
| Comparative Example 4 | 139.6 | 101.3 | 63.2 |
| Comparative Example 5 | 122.3 | 90.1 | 48.5 |

In Table 1, M represents Ni, Co or Mn. $Ni^{3+}$% and $Co^{3+}$% are percentages based on the total Ni and Co, respectively. These $Ni^{3+}$% and $Co^{3+}$% were determined by oxidation-reduction titration. Illustratively, 0.2 g of a sample was dissolved in 0.25M $FESO_4$-3.6N $H_2SO_4$ solution, and 2 ml of a concentrated phosphoric acid was added to the solution. The resultant mixture was titrated with a 0.1N $KMnO_4$ solution. Blank test was carried out in the same manner as described above. The $Ni^{3+}$% or $Co^{3+}$% of the sample was calculated by the following formula (2). In the formula (2), f represents the factor of the 0.1N $KMnO_4$ solution, $x_0$ the titer of the blank test (ml), x the titer (ml), and m the amount of the sample (g), and A is 5,871 in the case of Ni and 5.893 in the case of Co.

$$Ni^{3+} \%(\text{or } Co^{3+} \%) \text{ of the sample} = \frac{f \times (x_0 - x) \times A \times 10^{-3}}{m} \times 10^2 \quad (2)$$

$Ni^{3+}$% or $Co^{3+}$% was calculated by introducing the value calculated by the formula (2) in the following formula (3).

$$Ni^{3+} \% (Co^{3+} \%) = \frac{Ni^{3+} \% (Co^{3+} \%) \text{ of sample}}{\text{Total Ni \% (Co \%)}} \quad (3)$$

The above X-ray diffractometry was carried out using "Geiger-Flex RAD-IA" (trade name, manufactured by Rigaku Denki Co., Ltd.).

INDUSTRIAL APPLICABILITY

As described above $LiM^{3+}O_2$ or $LiMn_2O_4$ which is uniform in composition and highly purified and has a high crystallization degree, so that it can be employed as an active material of a positive electrode of a secondary battery having excellent charge-discharge characteristics, can be produced by a simple process on a commercial scale according to the present invention.

We claim:

1. A process for producing a compound of the formula $LiM^{3+}O_2$, wherein $M^{3+}$ is $Ni^{3+}$ or/and $Co^{3+}$, or $LiMn_2O_4$, comprising the steps of:

reacting a basic metal salt represented by the formula:

$$M^{2+}(OH)_{2-nx}(A^{n-})_x \cdot mH_2O \qquad (1)$$

wherein $M^{2+}$ is at least one member selected from the group consisting of $Ni^{2+}$, $Co^{2+}$ and $Mn^{2+}$, $A^{n-}$ is an n-valent anion, provided that n is 1 to 3, selected from the group consisting of $NO_3^-$, $Cl^-$, $Br^-$, $CH_3COO^-$, and $CO_3^{2-}$, and x and m are positive numbers respectively satisfying $0.03 \leq x \leq 0.3$ and $0 \leq m \leq 2$, with an alkaline water-soluble lithium compound in a molar ratio of $Li/M^{2+}$ of 0.3 to 1.3 in an aqueous medium to obtain a slurry, drying the obtained slurry, and firing the resultant residue at about 500° C. or higher in an oxidative atmosphere.

2. The process for producing a compound of the formula $LiM^{3+}O_2$ wherein $M^{3+}$ is $Ni^{3+}$ or/and $Co^{3+}$, or $LiMn_2O_4$ according to claim 1, wherein said alkaline water-soluble lithium compound is LiOH, and said $A^{n-}$ of the basic metal salt of the formula $M^{2+}(OH)_{2-nx}(A^{n-})_x \cdot mH_2O$ is $NO_3^-$.

3. The process for producing a compound of the formula $LiM^{3+}O_2$ wherein $M^{3+}$ is $Ni^{3+}$ is or/and $Co^{3+}$, according to claim 1 wherein said $M^{2+}$ of the basic metal salt of the formula $M^{2+}(OH)_{2-nx}(A^{n-})_x \cdot mH_2O$ is $Ni^{2+}$.

4. The process for producing a compound of the formula $LiM^{3+}O_2$ wherein $M^{3+}$ is $Ni^{3+}$ or/and $Co^{3+}$, or $LiMn_2O_4$ according to claim 1, wherein said drying is performed by a spray drying.

5. A compound of the formula $LiNi^{3+}O_2$ for use in a positive electrode of a secondary battery, which contains Ni, at least 97.0% of which is trivalent, and whose X-ray diffraction pattern shows a ratio of peak intensity relating to crystal face (003) to peak intensity relating to crystal face (104) of at least 1.3, said crystal face being defined by Miller indicies (hkl).

* * * * *